Patented Apr. 8, 1924.

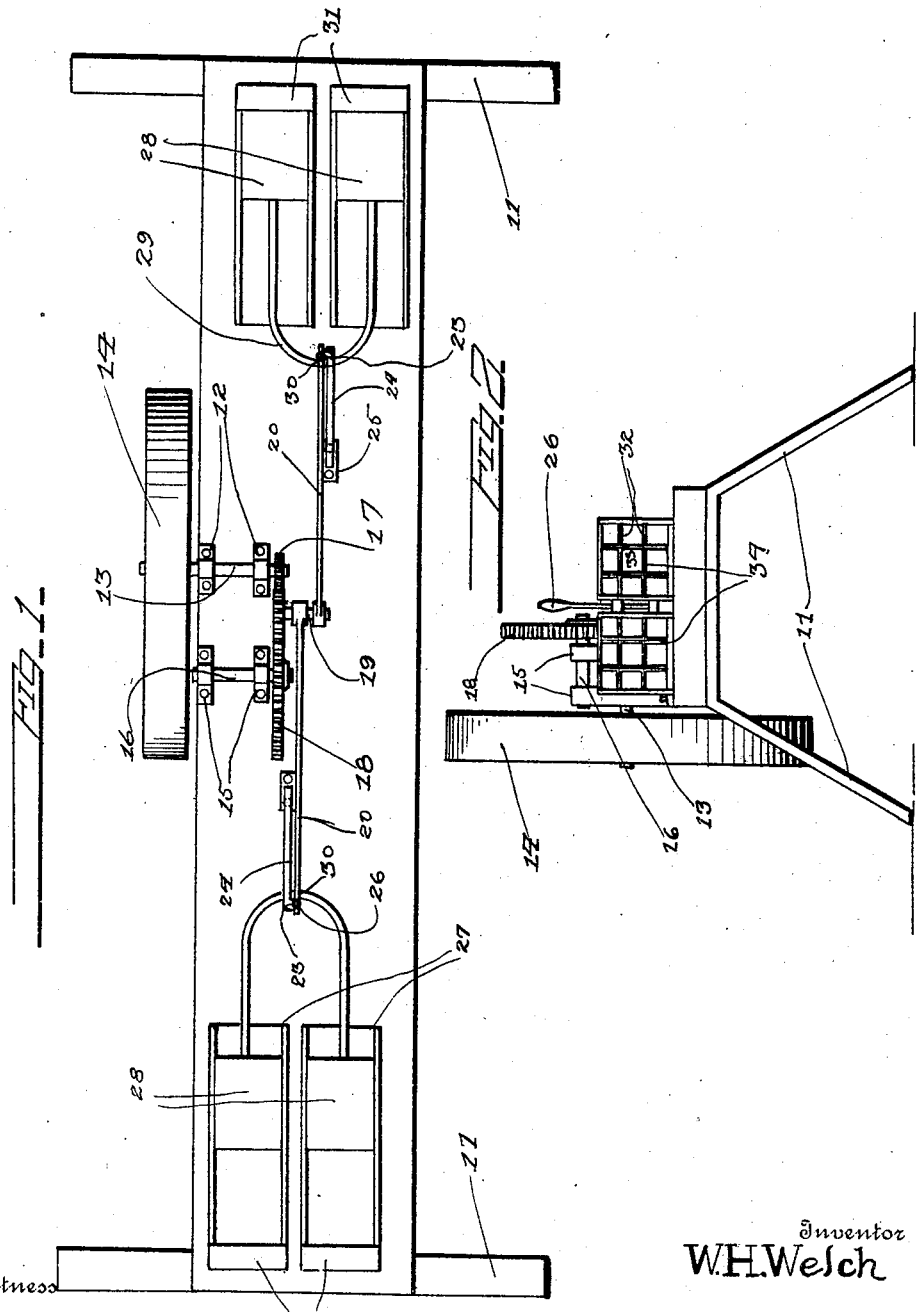
April 8, 1924.  W. H. WELCH  1,489,568
POWER POTATO CUTTER
Filed Sept. 23, 1919  2 Sheets-Sheet 1

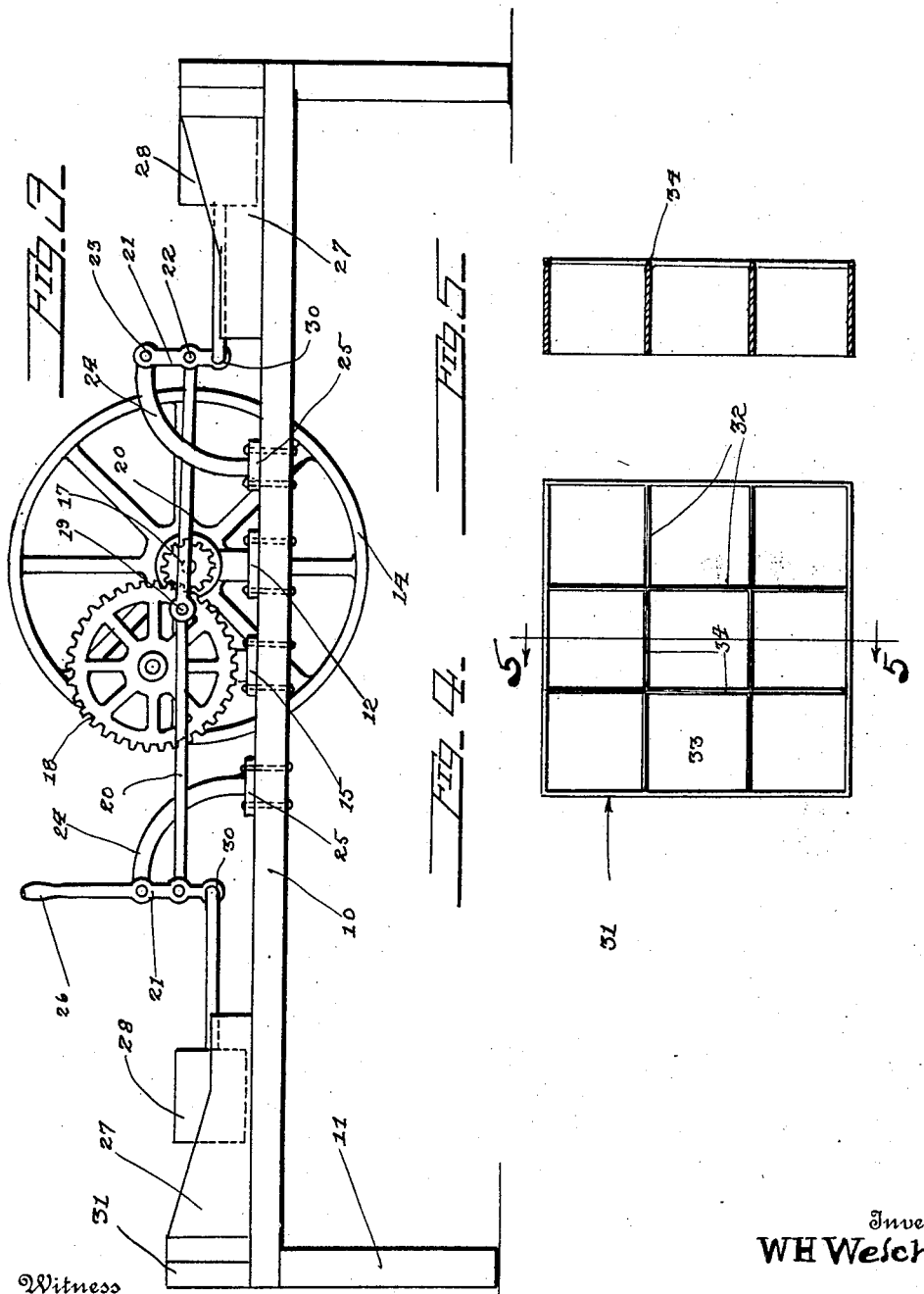

1,489,568

UNITED STATES PATENT OFFICE.

WILLIAM H. WELCH, OF WADENA, MINNESOTA.

POWER POTATO CUTTER.

Application filed September 23, 1919. Serial No. 325,689.

*To all whom it may concern:*

Be it known that I, WILLIAM H. WELCH, a citizen of the United States, residing at Wadena, in the county of Otter Tail and State of Minnesota, have invented a new and useful Power Potato Cutter, of which the following is a specification.

This invention relates to an improved machine for cutting vegetables and the like, and more particularly for cutting up potatoes for planting purposes.

The primary object of the invention is to provide an improved seed potato cutter which may be operated by power or by hand and is provided with novel actuating means whereby the potatoes may be quickly and properly cut to provide necessary portions containing eyes for planting purposes, the device being so arranged as to cut a plurality of potatoes at one time.

With the above objects and others in view, the invention comprises certain novel combinations and arrangements of parts as will be hereinafter more particularly set forth and claimed.

In the accompanying drawings:

Figure 1 is a plan view of my improved seed potato cutter,

Figure 2 is an end elevation thereof,

Figure 3 is a side elevation,

Figure 4 is an enlarged end view of a cutter, and

Figure 5 is a sectional view on the line 5—5 of Figure 4.

Referring to the drawings in detail, my improved cutter is shown as embodying a platform or table 10 having supporting legs 11 at the ends thereof, said table being preferably in the form of an elongated board or plank mounted at its ends upon said legs, which are preferably of metal and about two feet high.

Journaled in bearings 12 transversely of the table to one side of its longitudinal center is a shaft 13 on which is mounted a combined fly wheel and belt pulley 14 around which a suitable drive belt is adapted to be engaged, although it is to be understood that said shaft may be rotated in any other desired way. Journaled in bearings 15 is a shaft 16 which extends transversely parallel to the shaft 13 and intermediately of the longitudinal axis of the table. Mounted on the inner end of the shaft 13 is a small pinion 17 disposed in mesh with a large spur gear 18 mounted on the inner end of the shaft 16, it being understood that said pinion and gear are fixed to their respective shafts.

The gear wheel 18 is provided with a crank pin 19 having pivotal engagement with oppositely extending connecting rods 20, the outer ends of said rods being pivoted to the intermediate portions of levers 21 as shown at 22. These levers are pivotally suspended at their upper ends as shown at 23, to the free ends of outwardly extending overhanging castings or bearings 24 preferably of arcuate formation and anchored at their inner lower ends to the table as shown at 25. One of the levers 21 may be extended upwardly to form a handle 26 to permit the device to be manually actuated if desired.

Mounted upon the table near each end thereof is a pair of hoppers 27 in which are mounted to reciprocate plungers 28. These hoppers are disposed in parallel relation at each end and in alignment longitudinally with the arms of adjacent yokes 29 having connection with said plungers at their extremities and having pivotal connection with the lower ends of the levers 21, at their bight portions as shown at 30. The hoppers at opposite ends are located in staggered relation owing to the connection of the rods 20 with the crank pin, one outwardly of the other, and so that as the gear is rotated, the plungers will be reciprocated in opposite directions within the respective hoppers.

At the outer ends of the hoppers are mounted cutters 31 preferably comprising a series of blades 32 crossing each other at right angles, thereby providing a series of rectangular apertures 33. These cutters are removably mounted at the outer ends of the hoppers and when the device is in use, the plungers are reciprocated either by power, as by means of a belt engaged on the pulley 14 or manually by the lever 26, resulting in the oscillation of the levers 21, while the pulley acts as a fly wheel to insure steady running. The potatoes or the like to be cut are fed into the hoppers when the plungers are at the limits of their rearward strokes and as the plungers move forwardly, the potatoes will be forced against the knives and cutting edges 34 thereof, thus resulting in the potatoes being cut in a number of pieces, the majority of which will contain eyes. The device will operate irrespective of the size of the potato and may be used for cutting various vegetables, fruit or the like into pieces.

Having thus described the invention, what is claimed is:

In a machine of the class described, a table, hoppers supported at each end of the table, cutting members mounted at the outer ends of the hoppers, said hoppers and cutters being arranged in pairs, gearing supported intermediate the ends of the table, connecting rods having connection with the gearing, plungers operating in the hoppers, a curved member having connection with each connecting rod, and having its ends connected with the plungers whereby movement of the connecting rods produces a relative movement of the plungers to force material to the cutting members, and manually controlled means for operating the gearing.

In testimony that I claim the foregoing as my own, I have hereto affixed my signature in the presence of two witnesses.

WILLIAM H. WELCH.

Witnesses:
J. H. MARK,
J. A. DOWNING.